US012610061B2

(12) United States Patent
Kim et al.

(10) Patent No.: US 12,610,061 B2
(45) Date of Patent: Apr. 21, 2026

(54) METHOD AND APPARATUS FOR THE REGION OF INTEREST ENCRYPTION IN HEVC/H.265 VIDEO BASED ON THE CODING UNIT

(71) Applicant: Industry-Academia Cooperation Group Of Sejong University, Seoul (KR)

(72) Inventors: Young-Gab Kim, Seoul (KR); Jin-Yong Yu, Seoul (KR)

(73) Assignee: Industry-Academia Cooperation Group Of Sejong University, Seoul (KR)

( * ) Notice: Subject to any disclaimer, the term of this patent is extended or adjusted under 35 U.S.C. 154(b) by 0 days.

(21) Appl. No.: 18/235,561

(22) Filed: Aug. 18, 2023

(65) Prior Publication Data

US 2024/0163458 A1    May 16, 2024
US 2025/0240434 A9    Jul. 24, 2025

(30) Foreign Application Priority Data

Aug. 19, 2022    (KR) ........................ 10-2022-0104051

(51) Int. Cl.
| | |
|---|---|
| *H04N 19/167* | (2014.01) |
| *G06F 21/60* | (2013.01) |
| *G06V 20/40* | (2022.01) |
| *G06V 40/16* | (2022.01) |
| *H04N 19/119* | (2014.01) |
| *H04N 19/13* | (2014.01) |
| *H04N 19/159* | (2014.01) |

(Continued)

(52) U.S. Cl.
CPC ......... *H04N 19/167* (2014.11); *G06F 21/602* (2013.01); *G06V 20/49* (2022.01); *G06V 40/161* (2022.01); *H04N 19/119* (2014.11); *H04N 19/13* (2014.11); *H04N 19/159* (2014.11); *H04N 19/172* (2014.11); *H04N 19/70* (2014.11)

(58) Field of Classification Search
CPC .... H04N 19/119; H04N 19/13; H04N 19/159; H04N 19/167; H04N 19/172; H04N 19/70; G06V 20/49; G06V 40/161; G06F 21/602
See application file for complete search history.

(56) References Cited

U.S. PATENT DOCUMENTS 11,546,141 B1 *   1/2023   Guest .................... H04L 9/0825
2007/0296817 A1 *   12/2007   Ebrahimi ................. H04N 7/18
                                                 348/161

(Continued)

OTHER PUBLICATIONS

Z. Shahid and W. Puech, "Visual Protection of HEVC Video by Selective Encryption of CABAC Binstrings," in IEEE Transactions on Multimedia, vol. 16, No. 1, pp. 24-36, Jan. 2014 (Year: 2014).*

(Continued)

*Primary Examiner* — Jeremiah C Hallenbeck-Huber
(74) *Attorney, Agent, or Firm* — Hayes Soloway P.C.

(57) ABSTRACT

A method and apparatus for encrypting an ROI in a HEVC/H.265 video based on a coding unit are disclosed. The method, which is performed by an encryption apparatus, may include identifying a coding unit related to an ROI that is generated for each frame as the frames that constitute a video are partitioned as a tile, and performing selective encryption on the identified coding unit.

7 Claims, 10 Drawing Sheets

(a) ROI encryption using FMO in AVC/H.264 video (b) ROI encryption using tile in HEVC/H.265 video

(51) Int. Cl.
H04N 19/172 (2014.01)
H04N 19/70 (2014.01)

(56) References Cited

U.S. PATENT DOCUMENTS

| | | | | |
|---|---|---|---|---|
| 2008/0117295 | A1* | 5/2008 | Ebrahimi | G08B 13/19604 |
| | | | | 348/143 |
| 2009/0067626 | A1* | 3/2009 | Dufaux | H04N 21/4728 |
| | | | | 380/217 |
| 2011/0158470 | A1* | 6/2011 | Martin | H04N 19/20 |
| | | | | 382/100 |
| 2013/0035979 | A1* | 2/2013 | Tenbrock | G06Q 30/02 |
| | | | | 705/7.29 |
| 2015/0125042 | A1* | 5/2015 | Haden | G06V 20/52 |
| | | | | 382/105 |
| 2015/0350659 | A1* | 12/2015 | Auyeung | H04N 19/33 |
| | | | | 375/240.26 |
| 2016/0050341 | A1* | 2/2016 | Erdler | H04N 1/4486 |
| | | | | 380/245 |
| 2016/0165248 | A1* | 6/2016 | Lainema | H04N 19/70 |
| | | | | 375/240.08 |
| 2017/0076572 | A1* | 3/2017 | Rao | H04N 19/30 |
| 2017/0359596 | A1* | 12/2017 | Kim | H04N 19/132 |
| 2019/0377901 | A1* | 12/2019 | Balzer | G06F 21/6254 |
| 2020/0267392 | A1* | 8/2020 | Lu | H04N 19/503 |
| 2023/0028426 | A1* | 1/2023 | Nadeem | H04N 19/176 |
| 2023/0067541 | A1* | 3/2023 | Boyce | H04N 19/167 |

OTHER PUBLICATIONS

Bochkovskiy, Alexey; Wang, Chien-Yao; Mark Liao, Hong Yuan; "YOLOv4: Optimal Speed and Accuracy of Object Detection" ; Apr. 23, 2020; available at https://arxiv.org/abs/2004.10934 (Year: 2020).*

"YOLOv4—Ultralytics YOLO Docs", retrieved Oct. 19, 2024; available at https://docs.ultralytics.com/models/yolov4/ (Year: 2024).*

Mousa Farajallah, "ROI Encryption for the HEVC Coded Video Contents", Article, 2015, 1-5, 2015 IEEE International Conference on Image Processing (ICIP).

Yiqi Tew, "Region-of-Interest Encryption in HEVC Compressed Video", Article, 2016, 1-2, 2016 International Conference on Consumer Electronics-Taiwan.

Jimin Yu, "Face Mask Wearing Detection Algorithm Based on Improved YOLO-v4", Article, 2021, 1-21, vol. 21, Sensors.

* cited by examiner (a) ROI encryption using FMO in AVC/H.264 video

☐ ROI  ▨ Encrypted area  ----- Macroblock boundary  ---- Tile boundary  ---- CU boundary (b) ROI encryption using tile in HEVC/H.265 video ☐ ROI  ▨ Encrypted area  ----- Macroblock boundary  ---- Tile boundary  ---- CU boundary

100

Processor

Coding unit identification unit — 310

Selective encryption unit — 320

FIG. 7A                    FIG. 7B                    FIG. 7C

METHOD AND APPARATUS FOR THE REGION OF INTEREST ENCRYPTION IN HEVC/H.265 VIDEO BASED ON THE CODING UNIT

CROSS-REFERENCE TO RELATED APPLICATIONS AND PRIORITY

This patent application claims priority from Korean Patent Application No. 10-2022-0104051 filed Aug. 19, 2022.

TECHNICAL FIELD

The following description relates to a technology for encrypting a HEVC/H265 video

BACKGROUND OF THE DISCLOSURE

The encryption of a region of interest (ROI) in the existing HEVC/H.265 is basically performed on the basis of a tile, that is, a function provided in HEVC/H.265. In this case, all tiles having an ROI and a common region are encrypted. A region wider than an actually detected ROI is encrypted. In a video domain, an advantage of the encryption of the ROI is to reduce the complexity of calculation and to improve the encryption speed by applying an encryption algorithm to only a region designated by a user. It is difficult to obtain such an advantage through the encryption of the ROI based on a tile. Furthermore, a domain in which an encrypted video may be used is limited because even the surroundings of the ROI, which need to be preserved, are irregularly encrypted. The reason why such a problem occurs is that in HEVC/H.265, it is difficult to designate a region which may be independently processed unlike in AVC/H.264. From the nature of encoding and decoding, encryption propagation in which an encryption effect affects a surrounding pixel occurs although the encryption is applied to only a range designated by a user. Accordingly, an independent region is necessary in order to perform the encryption of the ROI in the video domain. However, in HEVC/H.265, it is difficult to designate an independent region because each of frames having different sizes is partitioned in a coding unit (CU). Although an independent region is designated, compression performance is greatly degraded. Accordingly, the encryption of an ROI in HEVC/H.265 and the encryption of an ROI in AVC/H.264 have a difference between encrypted regions as in FIGS. 1A-1B.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments may provide a method and apparatus for identifying a coding unit related to a region of interest (ROI) that is generated for each frame because frames that constitute a video are partitioned as a tile and performing selective encryption on the identified coding unit.

Embodiments may provide a method and apparatus for restricting the encryption propagation of an ROI that is encrypted through a coding unit on which selective encryption has been performed.

A method of encrypting a region of interest (ROI) in a HEVC/H.265 video, which is performed by an encryption apparatus, may include identifying a coding unit related to an ROI that is generated for each frame as the frames that constitute a video are partitioned as a tile, and performing selective encryption on the identified coding unit.

Identifying the coding unit may include detecting the ROI in the video by using an object detection model, and obtaining coordinate data of the detected ROI.

Identifying the coding unit may include divisively indicating a tile related to the ROI and a tile not related to the ROI, based on the obtained coordinate data of the ROI.

Identifying the coding unit may include divisively indicating a coding unit related to the ROI and a coding unit not related to the ROI, based on the obtained coordinate data of the ROI.

The object detection model may be trained to detect a face as an object by using learning data for object detection based on a YOLOv4 object detection algorithm.

Identifying the coding unit may include partitioning the identified coding unit into at least one prediction unit through intra prediction or inter prediction for the identified coding unit.

Identifying the coding unit may include performing entropy encoding on the identified coding unit via a discrete coefficient transform (DCT) and quantization.

Performing the selective encryption may include performing the selective encryption based on context-adaptive binary arithmetic coding (CABAC) during an entropy encoding process for the identified coding unit.

Performing the selective encryption may include performing the selective encryption on the identified coding unit based on CABAC for parameters of a codec.

The codec may be HEVC/H.265.

Performing the selective encryption may include performing the selective encryption on syntax elements corresponding to the parameters of the codec, and deriving a compressed and encrypted video bit stream through the performed selective encryption.

A non-binarized syntax element, among the syntax elements, may be transformed into a bin through binarization, and encryption may be performed on a suffix part of a bin corresponding to the coding unit, among the transformed bins.

Identifying the coding unit may include restricting encryption propagation in a coding tree unit (CTU).

A computer program stored in a non-transitory computer-readable recording medium in order to execute the method of encrypting a region of interest (ROI) in an encryption apparatus may be provided.

An encryption apparatus may include a coding unit identification unit configured to identify a coding unit related to a region of interest (ROI) that is generated for each frame as the frames that constitute a video are partitioned as a tile, and a selective encryption unit configured to perform selective encryption on the identified coding unit.

A tool, such as flexible macroblock ordering (FMO), does not need to be used in order to designate an independent region in AVC/H.264 because a lightweight method of performing encryption based on the coordinates of a detected object is adopted.

Furthermore, similar encryption performance (i.e., a peak signal to noise ratio (PSNR) or structural similarity index measure (SSIM)) can be obtained with respect to a detected ROI, and an overall encryption speed can be increased.

Accordingly, an encryption ratio (ER) and an intersection over union (IOU) for a video can be improved and the original video around an encrypted ROI can be preserved because encryption propagation is restricted in a CTU level.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Figure 3:
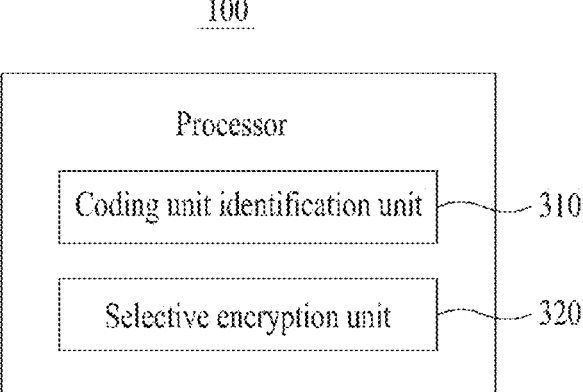
FIG. 3 is a block diagram for describing a construction of an encryption apparatus in an embodiment.
Figure 4:
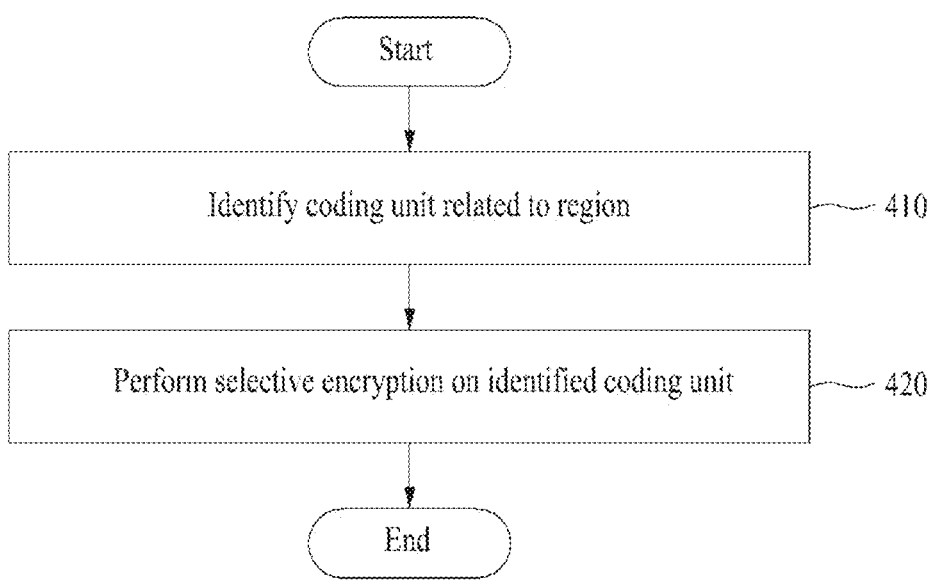
FIG. 4 is a flowchart for describing a method of encrypting an ROI in an embodiment.

FIG. 3 is a block diagram for describing a construction of an encryption apparatus 100 in an embodiment. FIG. 4 is a flowchart for describing a method of encrypting a region of interest (ROI) in an embodiment.

A processor of the encryption apparatus 100 may include a coding unit identification unit 310 and a selective encryption unit 320. The components of the processor may be the expressions of different functions that are performed by the processor in response to a control command that is provided by a program code stored in the encryption apparatus. The processor and the components of the processor may control the encryption apparatus that performs steps 410 and 420 included in a method of encrypting an ROI illustrated in FIG. 4. In this case, the processor and the components of the processor may be implemented to execute instructions according to a code of an operating system and a code of at least one program, which are included in memory.

The processor may load, onto the memory, a program code stored in a program file for the method of encrypting an ROI. For example, when a program is executed in the encryption apparatus, the processor may control the encryption apparatus to load the program code from the program file to the memory under the control of an operating system. In this case, the coding unit identification unit 310 and selective encryption unit 320 of the processor may be the expressions of different functions of the processor for executing instructions of corresponding parts in the program code loaded onto the memory and subsequently executing steps 410 and 420, respectively.

In step 410, the coding unit identification unit 310 may identify a coding unit related to an ROI that is generated for each frame as frames that constitute a video are partitioned as a tile. The coding unit identification unit 310 may detect the ROI in the video by using an object detection model, and may obtain coordinate data of the detected ROI. The coding unit identification unit 310 may divisively indicate a tile related to the ROI and a tile not related to the ROI, based on the obtained coordinate data of the ROI. The coding unit identification unit 310 may divisively indicate a coding unit related to the ROI and a coding unit not related to the ROI, based on the obtained coordinate data of the ROI. The coding unit identification unit 310 may partition at least one prediction unit from the identified coding unit through intra prediction or inter prediction for the identified coding unit. The coding unit identification unit 310 may perform entropy encoding on the identified coding unit via a discrete coefficient transform (DCT) and quantization. Furthermore, the coding unit identification unit 310 may restrict encryption propagation in a coding tree unit (CTU).

In step 420, the selective encryption unit 320 may perform selective encryption on the identified coding unit. The selective encryption unit 320 may perform the selective encryption based on context-adaptive binary arithmetic coding (CABAC) during an entropy encoding process for the identified coding unit. The selective encryption unit 320 may perform the selective encryption based on CABAC for the parameters of a codec, based on the identified coding unit. The selective encryption unit 320 may perform the selective encryption on a syntax element corresponding to the parameters of the codec. The selective encryption unit 320 may derive a compressed and encrypted video bit stream by performing the selective encryption on the syntax element corresponding to the parameters of the codec.

Figure 1A:
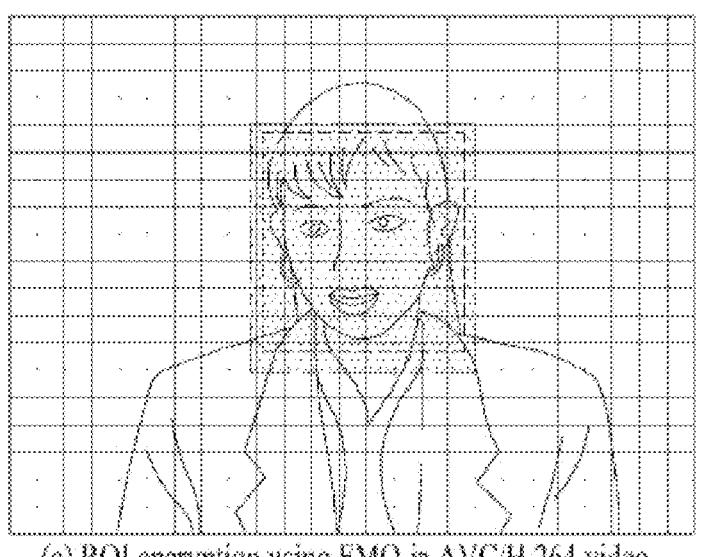
FIGS. 1A-1B are diagrams illustrating a difference between the encryption of an ROI in AVC/H.264 and the encryption of a region of interest (ROI) in HEVC/H.265.
Figure 1B:
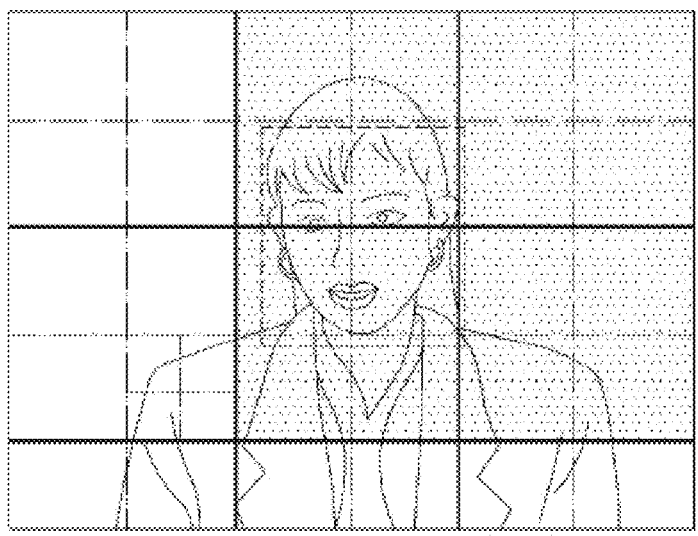
Figure 2:
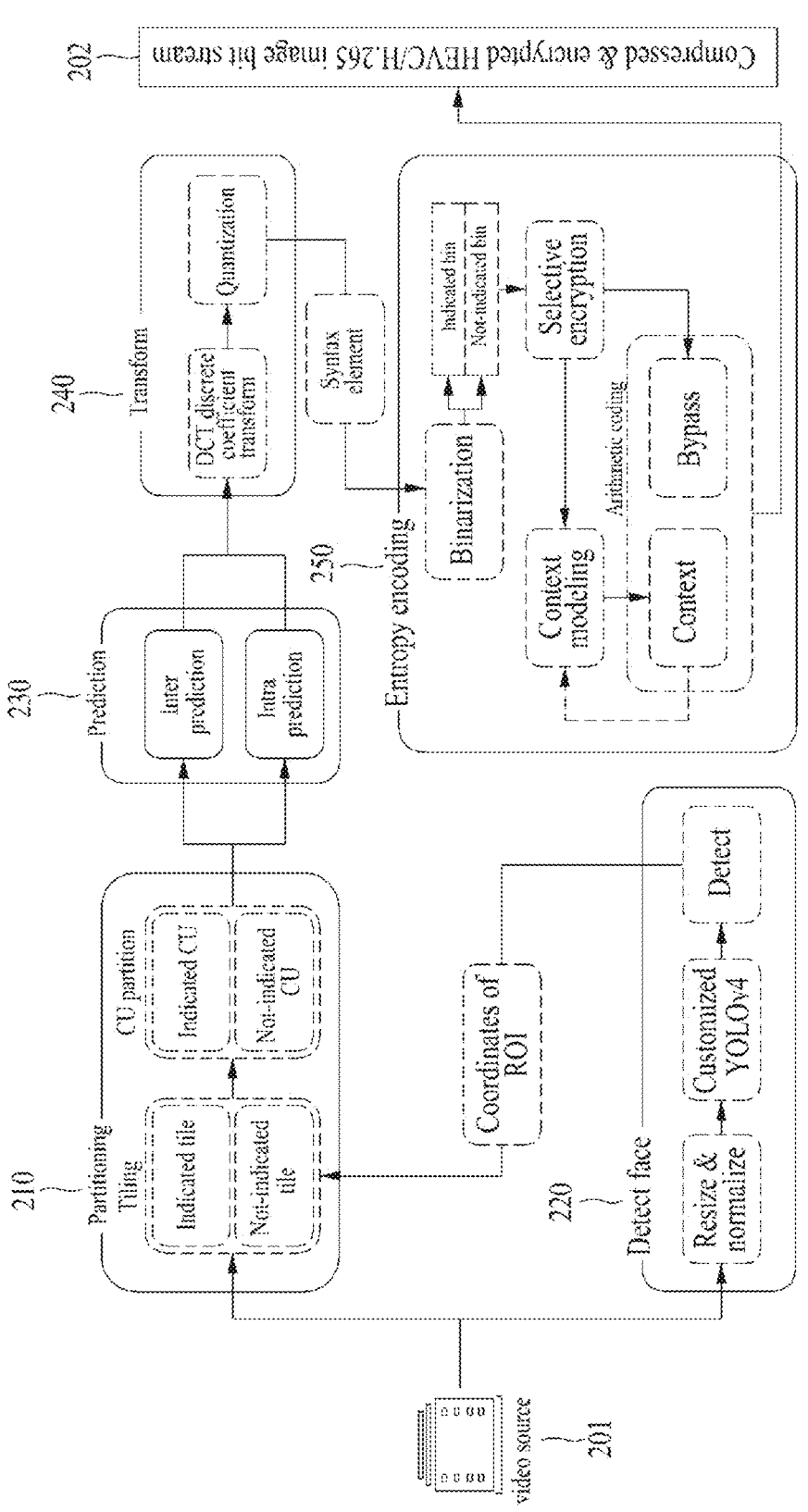
FIG. 2 is a diagram for describing an operation of encrypting an ROI based on a coding unit in an embodiment.

Hereinafter, an operation of encrypting an ROI in an HEVC/H.265 video based on a coding unit is described more specifically with reference to FIG. 2.

The encryption apparatus may detect an ROI in a video source 201 by using the object detection model, and may obtain the coordinates of the detected ROI. For example, the encryption apparatus may detect an object in the video-source 201 by using the object detection model, and may obtain the coordinate data of an ROI including the detected object. In an embodiment, it is assumed and described that the ROI is a face. In general, the face of a person is chiefly selected as an ROI for personal information protection because various types of identification information appear in the face. The encryption apparatus may adopt YOLOv4 as a face detection model capable of the real-time detection of an object in order to detect the ROI. However, since the face cannot be detected based on the existing learning data, customized YOLOv4 for learning the face by using "WIDER FACE" data and detecting the face may be generated. The encryption apparatus may detect the face by using the customized YOLOv4, and may indicate a boundary and coordinate data including the detected face (i.e., ROI). The encryption apparatus may transmit the extracted coordinate data of the ROI to a partitioning step 210.

The encryption apparatus may classify the coordinate data of the ROI, received in the partitioning step 210, into a tile (an indicated tile) including the coordinate data of the ROI and a tile (a not-indicated coding tile) not including the coordinate data of the ROI. Likewise, the encryption apparatus may classify the coordinate data of the ROI into a coding unit (an indicated coding unit) including the coordinate data of the ROI and a coding unit (a not-indicated coding unit) not including the coordinate data of the ROI. Accordingly, a coding unit to which an encryption algorithm will be applied and a coding unit to which the encryption algorithm will not be applied may be classified.

The encryption apparatus may partition each coding unit into at least one prediction unit (PU), and may obtain a prediction unit value through intra or inter prediction in a prediction step 230. The encryption apparatus needs to restrict prediction so that a task for referring to a region that has been encrypted without copying a pixel outside the ROI designated in a decoding prediction process is not performed. The reason for this is that encryption propagation may occur with respect to the entire video although encryption is applied to a small region because a prediction task affects the entire processing unit (e.g., a tile or a frame).

The encryption apparatus may perform an entropy encoding step 250 via a discrete coefficient transform (DCT) and quantization in a transform step 240. In the entropy encoding step 250, the encryption apparatus may derive a compressed and encrypted HEVC/H.265 video bit stream 202 by selectively encrypting some (e.g., a motion vector (MV), an MV sign, a transform coefficient (TC), a TC sign, and an intra prediction mode (IPM)) which visually have a great influence on syntax elements that are transformed in a previous step.

Figure 5:
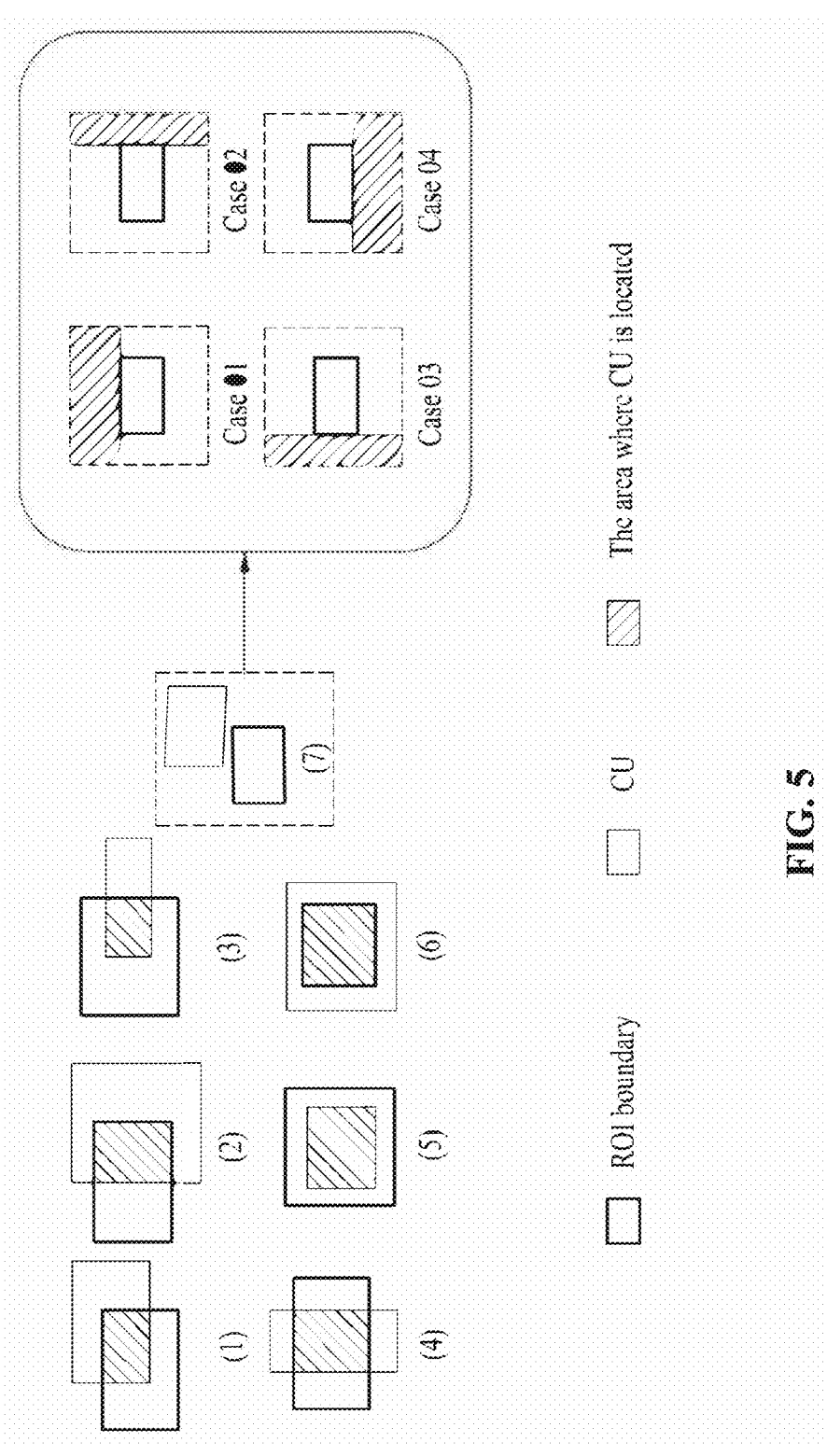
FIG. 5 is a diagram for describing the type of relation between an ROI and a coding unit in an embodiment.

FIG. 5 is a diagram for describing the type of relation between an ROI and a coding unit. The encryption apparatus may reduce an encryption area by encrypting only a coding unit related to an ROI. The encryption apparatus may identify the coding unit related to the ROI in a partitioning process. A coding unit identified in the partitioning process may be indicated. Thereafter, the encryption apparatus may distinguish between a coding unit not related to the ROI and a coding unit related to the ROI. The encryption apparatus may identify the coding units depending on whether two rectangular common regions are present in a two dimension. The encryption apparatus may identify a coding unit having a correlation with the ROI, based on coordinate data of the ROI including a detected object.

FIG. 5 illustrates a relation between two ROIs and a coding unit and cases when two ROIs and a coding unit do not have a relation. A case in which the ROI and the coding unit do not have a relation may be intensively analyzed. The type of case in which the ROI and the coding unit do not have a relation may be classified into four cases.

Assuming that left top coordinates (absolute coordinates) of a coding unit are ($CU_x$, $CU_y$) and the width of the coding unit is $CU_{width}$, coordinates at a right bottom edge are ($CU_x+CU_{width}$, $CU_y+CU_{width}$). Assuming that left top coordinates of an ROI are ($ROI_x$, $ROI_y$) and the width and height of the ROI are w and h, coordinates at a right bottom edge are ($ROI_x+w$, $ROI_y+h$). The four cases in which the coding unit and the ROI do not have a relation may be represented as follows.

$$\text{Case 1:} ROI_y \ CU_y + CU_{width} \qquad (1)$$

$$\text{Case 2:} ROI_x + w \ CU_x \qquad (2)$$

$$\text{Case 3:} ROI_x\big) CU_x + CU_{width} \qquad (3)$$

$$\text{Case 4:} ROI_y + h\langle CU_y \qquad (4)$$

If the above cases are satisfied, the encryption apparatus may determine that the coding unit and the ROI do not have a relation, and may identify the coding unit as a coding unit to which encryption is not applied. If the above cases are not satisfied, the encryption apparatus may determine that the coding unit and the ROI have a relation, and may identify the coding unit as a coding unit to which encryption needs to be applied.

Figure 6:
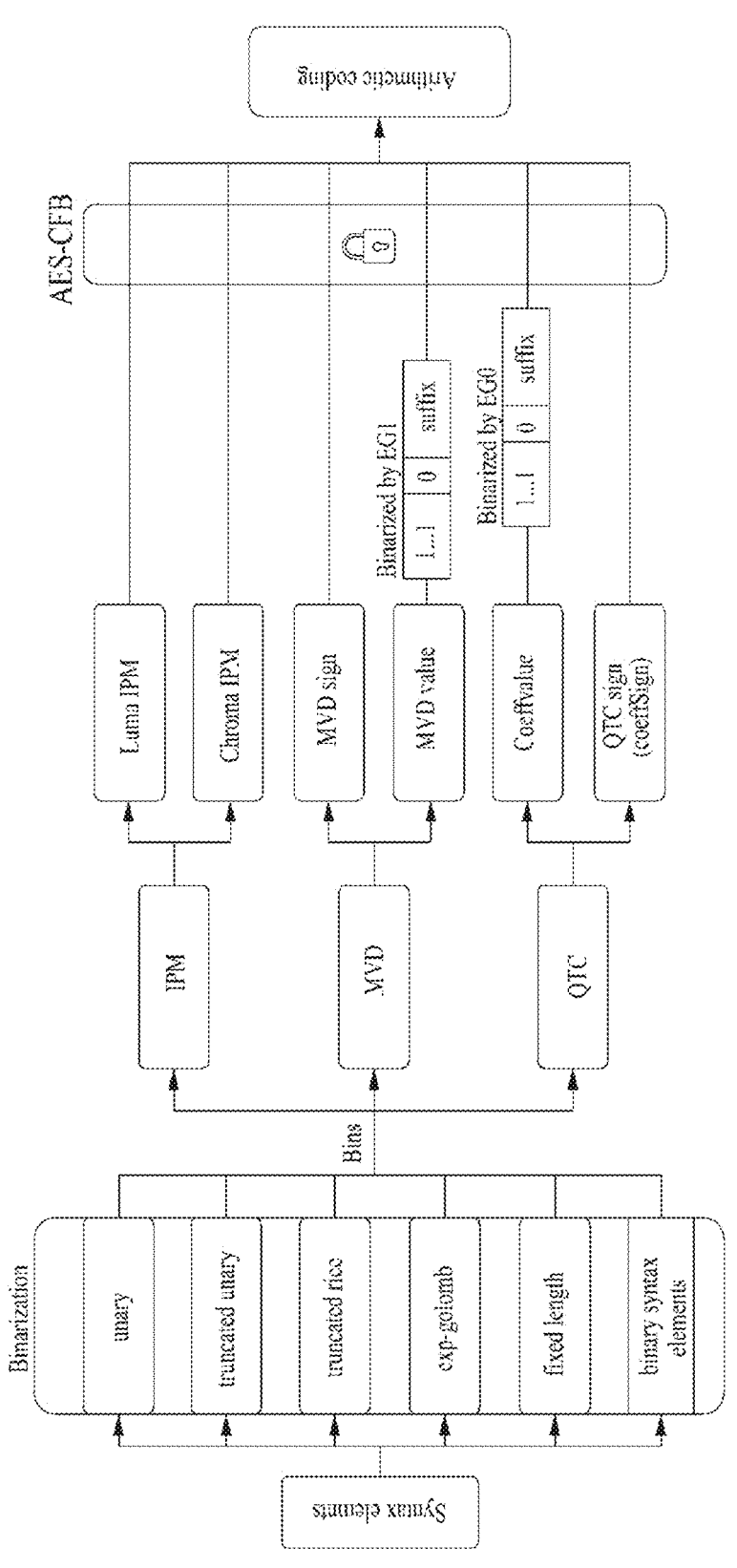
FIG. 6 is a diagram for describing an operation of encrypting selective syntax elements based on context-adaptive binary arithmetic coding (CABAC) in an embodiment.

FIG. 6 is a diagram for describing an operation of encrypting selective syntax elements based on CABAC. Entropy encoding is performed on an identified coding unit via a prediction process and a transform process. The coding unit needs to be still identified although an expression method of the coding unit has been slightly changed. The encryption apparatus may perform the entropy encoding on the identified coding unit via the prediction and transform processes. The encryption apparatus may perform encryption based on CABAC during the entropy encoding process, and may selectively perform encryption only on syntax elements corresponding to an HEVC/H.264 parameter MV, an MV sign, TC, a TC sign, and IPM which have a great visual influence. Prior to the encryption, as illustrated in FIG. 6, the encryption apparatus may perform encryption on only a bin corresponding to the identified coding unit through binarization with respect to a non-binarized syntax element. The non-binary syntax element may be converted into a bin text string through a binarization method, such as unary, truncated unary, fixed-length, a truncated rice code, and $k^{th}$-order exp-Golomb (EG) codes. Thereafter, the encryption apparatus may perform encryption on the bin text string corresponding to the identified coding unit, among the binarized syntax elements, in a CABAC bin string level. AES-CFB is used for the real-time encryption of the binarized syntax element. An initial vector IV may be set through a pseudorandom number generator. An encryption key may be set as $E_K$. An encrypted syntax element C for a key stream S generated by the initial vector may be generated through an XOR operation with a syntax element P. The key stream may be generated as follows.

$$S_i=E_k(C_{i-1}), \ i\geq 1 \qquad (1)$$

The selected syntax element should not cause a format compliance problem attributable to the encryption. Accordingly, the encryption apparatus may perform encoding on some syntax elements which may harm format compliance, by encrypting only suffix parts of the syntax elements so that the format compliance is not harmed.

The encryption apparatus may guarantee the format compliance and encrypt the suffix parts of some bins selected by using the bypass mode of CABAC in order to maintain a bit transfer rate. For example, in a process of encrypting syntax element quantization TC (QTC), the QTC may be binarized by a truncated rice code and a k-th EG code, and may be separately encrypted by using a sign bit (TC sign) and a non-0 QTC value (TC). The sign bit may be encrypted before it is encoded in the bypass mode. Such a value may be binarized by using an EG0 code, and may be then encrypted before being encoded into a next binary arithmetic code. The encryption of the QTC syntax element P(Q) is as follows.

$$C(Q)_i=P(Q)_i\oplus S_i, \ i\geq 1 \qquad (2)$$

To encode and encrypt a parameter MV means that an MV difference (MVD) between syntax elements is encoded and encrypted. The MVD have a great influence on visual quality because the MVD is closely related to a contour and a motion. Accordingly, the MVD shows high encryption performance. Furthermore, as in QTC encryption, in MVD encryption, a sign and a value may be separately performed. The MVD sign may be encrypted through XOR operation and encoded in the bypass mode. The value of the MVD may be binarized into an EG1 code. The encryption may be performed by an XOR operation of a suffix bit and the key stream S. Thereafter, the MVD may be encoded in the bypass mode. The encryption of luma IPM may be performed through an XOR operation of the number of candidate mode lists and the key stream S. A coefficient scanning mode needs to be synchronized by mapping the location of the last coefficient to the coefficient scanning mode because it may be difficult to decode the coefficient scanning mode due to IPM encryption. HEVC/H.265 includes five (planar, vertical, horizontal, DC, and corresponding luma IPM) chroma IPMs. In general, chroma IPM may be encrypted by an XOR operation only when a number in a chroma IPM list is not influenced because the chroma IPM is influenced by the encryption of luma IPM.

Figure 7:
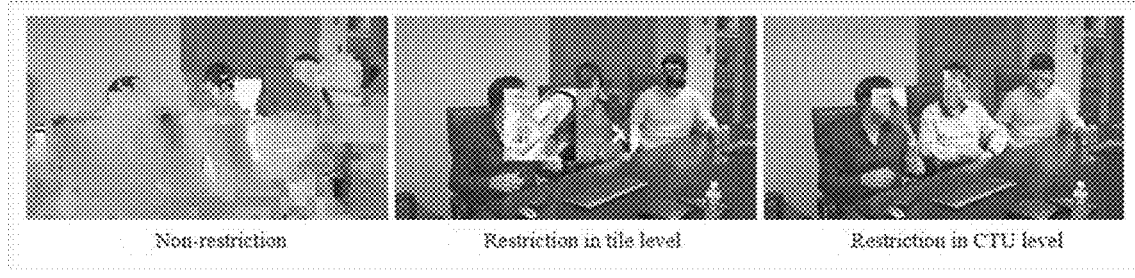
FIGS. 7A-7C are diagrams illustrating a decoded video according to a reference region restriction range in an embodiment.

FIGS. 7A-7C is a diagram illustrating a decoded video according to a reference region restriction range. FIG. 7A illustrates a video that is displayed when an encryption algorithm is applied to a coding unit related to an ROI without parallel processing, such as a tile. FIG. 7B illustrates a video that is displayed when a reference region is restricted in a tile level. FIG. 7C illustrates a video that is displayed when a reference region is restricted in a CTU level.

Although the encryption apparatus identifies a coding unit related to an ROI and performs encryption on only a bin corresponding to the identified coding unit, encryption propagation may occur in a wide region as in FIGS. 7A and 7B. Although the encryption is applied to only the identified coding unit in an entropy encoding process, such a problem occurs because prediction is performed with reference to a region that has been encrypted in a region in which a video needs to be generated normally in a decoding prediction process. Accordingly, reference should not be made to a region in which regions other than an ROI have been encrypted in a decoding prediction level. In this case, performance is reduced because a computation load is increased and a process is made complicated. Accordingly, it is preferred that encryption propagation is restricted in a certain level by setting an independent region in an encoding level. Accordingly, the encryption apparatus may obtain results in which a surrounding video can be relatively preserved as in FIG. 7C by restricting encryption propagation in the CTU. In other words, the encryption apparatus may restrict encryption propagation in the CTU in the partitioning step 210. In general, a minimum height of a tile that is provided in HEVC/H.265 is 128 pixels, whereas in the CTU, a minimum height of a tile that is provided in HEVC/H.265 is 64 pixels, that is, half the 128 pixels. Accordingly, the encryption propagation phenomenon can be restricted more specifically.

According to an embodiment, the method of encrypting an ROI in the existing HEVC/H.265 based on a tile can encrypt a region that is excessively large compared to a detected ROI and that wastes resources.

Figure 8:
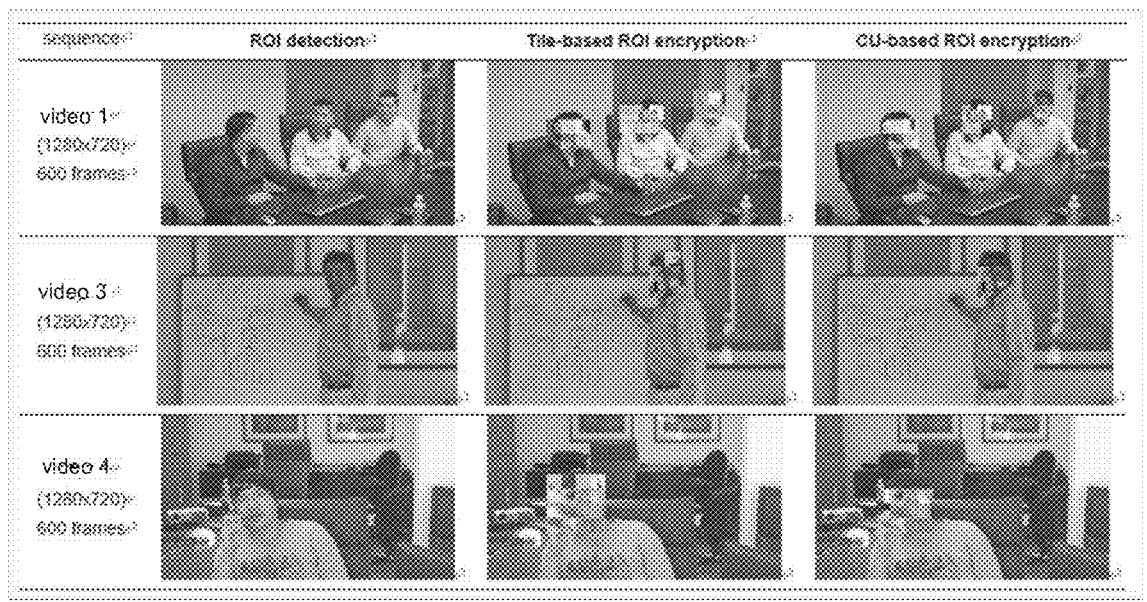
FIG. 8 is a diagram illustrating the results of a comparison between tile-based ROI encryption and CU-based ROI encryption in an embodiment.

FIG. 8 is a diagram illustrating the results of a comparison between tile-based ROI encryption and CU-based ROI encryption in an embodiment.

An experiment environment for deriving performance of CU-based ROI encryption according to an embodiment includes main memory of 64 GB, 64-bit 16 core AMD Threadripper PRO 3955WX that is executed at 3.90 GHz, and a Ubuntu 20.04 operating system. The encryption of an ROI based on a coding unit may be implemented based on kvazaar by an HEVC/H.265 encoder.

Figure 9A:
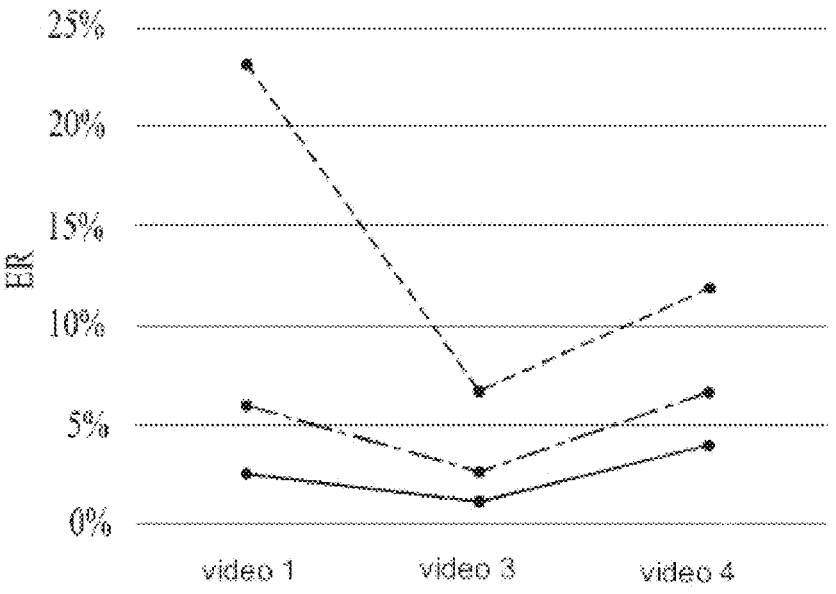
FIGS. 9A-9B are graphs illustrating the ratios of tile-based ROI encryption, CU-based ROI encryption, and encryption for a grounding truth and the results of a comparison between IOUs in an embodiment.
Figure 9B:
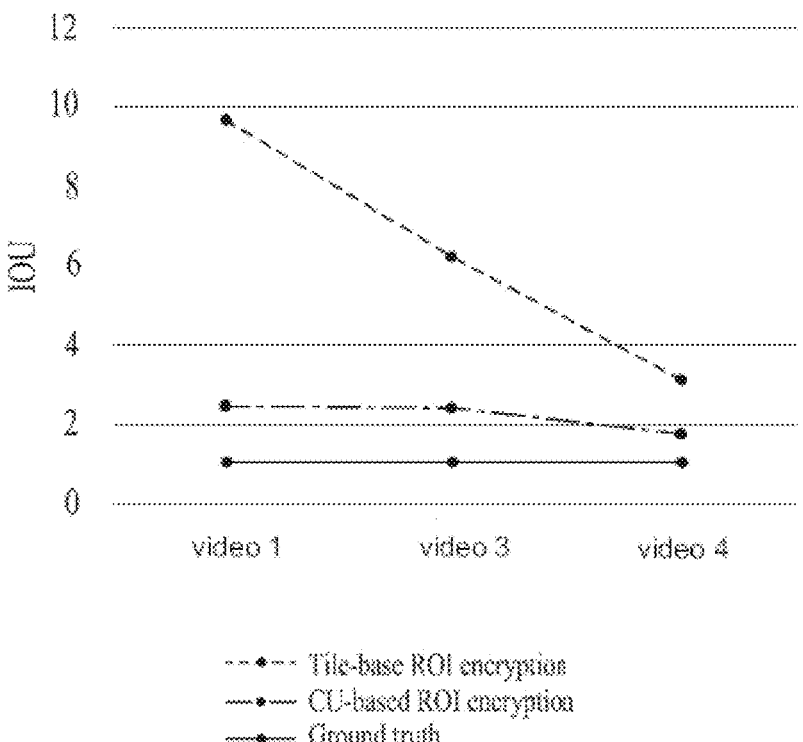

FIG. 8 illustrates the excellence of a method (i.e., CU-based ROI encryption) that is proposed in an embodiment by comparing the existing encryption of an ROI based on a tile and the proposed method. First, from FIG. 8, it may be seen that in the existing method, encryption is performed on a range that is excessively large compared to a detected ROI in a decoded video decoding. In contrast, in the proposed method according to an embodiment, a surrounding video is clearly preserved when an encryption area similar to a detected ROI appears. As may be seen from FIGS. 9A-9B, related detailed performance (i.e., an encryption ratio and an IOU) shows that in the method of encrypting an ROI based on a coding unit, a small ratio compared to a whole frame is encrypted and an IOU is close to a ground truth (i.e., IOU=1). Furthermore, Table 1 illustrates that encryption performance (i.e., a PSNR and SSIM) for an ROI is similar to that of the existing method.

TABLE 1

| Comparison between the PSNR and the SSIM for whole frame encryption, tile-based ROI encryption, and CU-based ROI encryption | | | | | | |
|---|---|---|---|---|---|---|
| | Whole-frame encryption | | Tile-based ROI encryption | | CU-based ROI encryption | |
| Sequence | PSNR | SSIM | PSNR | SSIM | PSNR | SSIM |
| video 1 | 9.36 | 0.21 | 9.49 | 0.23 | 9.29 | 0.19 |
| video 3 | 6.42 | 0.21 | 6.64 | 0.22 | 6.73 | 0.20 |
| video 4 | 8.19 | 0.23 | 8.26 | 0.22 | 8.22 | 0.24 |

Figure 10:
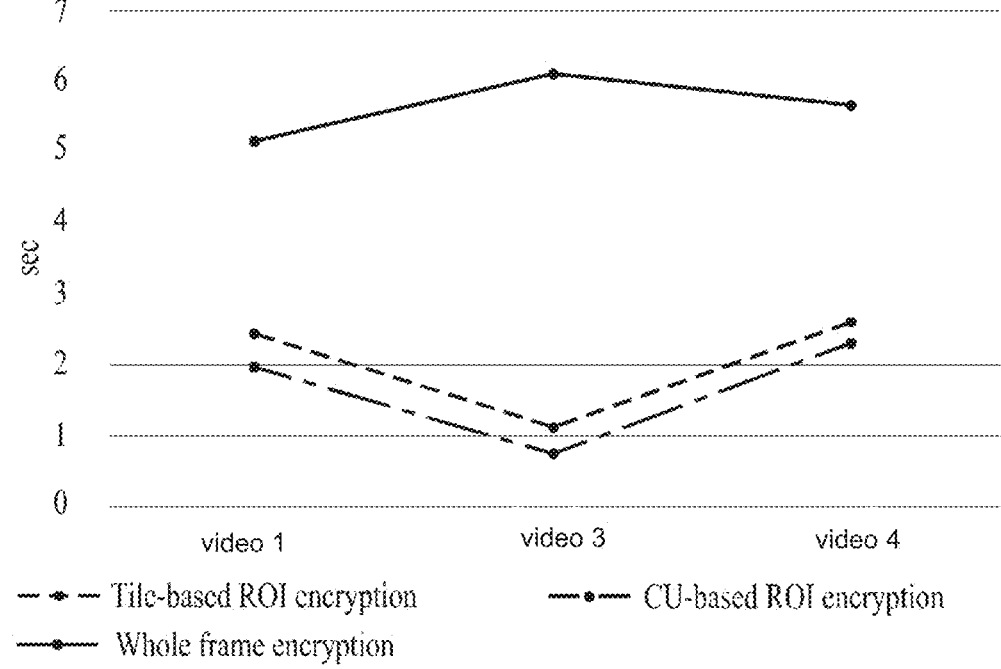
FIG. 10 is a graph illustrating encryption speeds of whole-frame encryption, tile-based ROI encryption, and CU-based ROI encryption in an embodiment.

Finally, even in terms of an encryption time, it may be seen that the proposed method is more excellent than the existing method as in FIG. 10.

The aforementioned device may be implemented as a hardware component, a software component, and/or a combination of a hardware component and a software component. For example, the device and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means, and may be stored in a computer-readable medium. In this case, the medium may include a program instruction, a data file, and a data structure solely or in combination. The program instruction recorded on the medium may be specially designed and constructed for an embodiment, or may be known and available to those skilled in the computer software field. Examples of the computer-readable recording medium include magnetic media such as a hard disk, a floppy disk, and a magnetic tape, optical media such as CD-ROM and a DVD, magneto-optical media such as a floptical disk, and hardware devices specially configured to store and execute a program instruction, such as ROM, RAM, and a flash memory. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A method of encrypting a region of interest (ROI) in a video encoded with a codec corresponding to HEVC (H.265), the method being performed by an encryption apparatus and comprising:

detecting the ROI in the video by using an object detection model and obtaining coordinate data of the detected ROI;

separately identifying a tile related to the ROI and a tile not related to the ROI, based on the obtained coordinate data;

separately identifying a coding unit related to the ROI and a coding unit not related to the ROI, based on the obtained coordinate data and the identified tile related to the ROI, the identified coding unit representing a processing unit for selective encryption which is distinct from the identified tile;

restricting encryption propagation by preventing prediction processes from referencing pixel data outside of a boundary of a coding tree unit (CTU) containing the identified coding unit related to the ROI; and performing selective encryption on one or more syntax elements corresponding to the identified coding unit related to the ROI, wherein performing the selective encryption comprises performing the selective encryption on the identified coding unit related to the ROI based on context-adaptive binary arithmetic coding (CABAC) for parameters of the codec corresponding to HEVC (H.265);

wherein the syntax elements are selected from a group consisting of a motion vector (MV), an MV sign, a transform coefficient (TC), a TC sign, and an intra prediction mode (IPM), and wherein the selective encryption is performed on a suffix part of a binarized representation of the syntax elements by applying an AES-CFB algorithm to perform an XOR operation between the suffix part and a generated key stream.

2. The method of claim 1, wherein the object detection model is trained to detect a face as an object by using learning data for object detection based on a YOLOv4 object detection algorithm.

3. The method of claim 1, wherein the step of separately identifying the coding unit comprises partitioning the identified coding unit into at least one prediction unit through intra prediction or inter prediction for the identified coding unit.

4. The method of claim 3, wherein the step of separately identifying the coding unit further comprises performing entropy encoding on the identified coding unit via a discrete coefficient transform (DCT) and quantization.

5. The method of claim 1, wherein performing the selective encryption comprises performing the selective encryption based on the CABAC during an entropy encoding process for the identified coding unit related to the ROI.

6. A non-transitory computer-readable recording medium storing instructions for executing the method of claim 1 on the encryption apparatus.

7. An encryption apparatus for encrypting a region of interest (ROI) in a video encoded with a codec corresponding to HEVC (H.265) comprising:

at least one processor configured to detect the ROI in the video by using an object detection model and obtaining coordinate data of the detected ROI, separately identify a tile related to the ROI and a tile not related to the ROI, based on the obtained coordinate data, separately identify a coding unit related to the ROI and a coding unit not related to the ROI, based on the obtained coordinate data and the identified tile related to the ROI, the identified coding unit representing a processing unit for selective encryption which is distinct from the identified tile, restrict encryption propagation by preventing prediction processes from referencing pixel data outside of a boundary of a coding tree unit (CTU) containing the identified coding unit related to the ROI, and perform selective encryption on one or more syntax elements corresponding to the identified coding unit related to the ROI, wherein the processor is configured to perform the selective encryption by performing the selective encryption on the identified coding unit related to the ROI based on context-adaptive binary arithmetic coding (CABAC) for parameters of the codec corresponding to HEVC (H.265);

wherein the syntax elements are selected from a group consisting of a motion vector (MV), an MV sign, a transform coefficient (TC), a TC sign, and an intra prediction mode (IPM), and wherein the selective encryption is performed on a suffix part of a binarized representation of the syntax elements by applying an AES-CFB algorithm to perform an XOR operation between the suffix part and a generated key stream.

* * * * *